July 18, 1967  G. LANE  3,331,728
PERFORATE FILM-FIBER LAMINATE
Filed Feb. 17, 1964
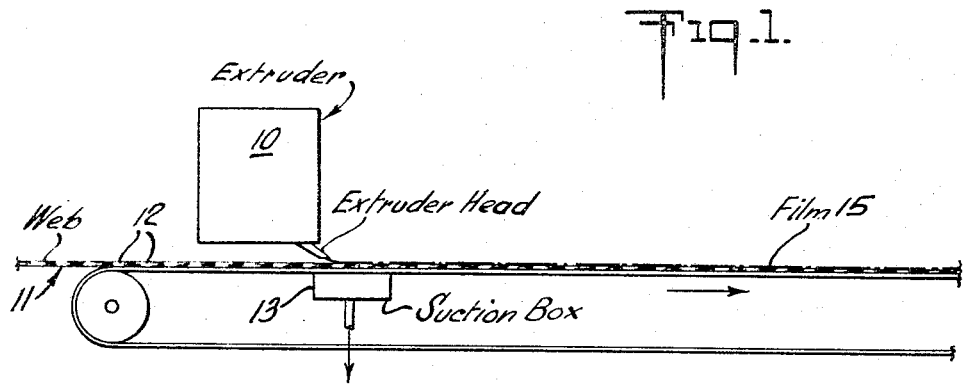
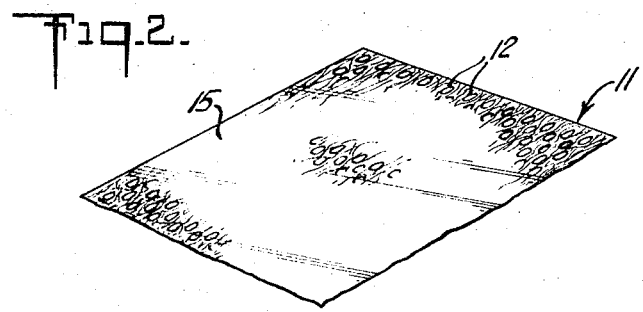
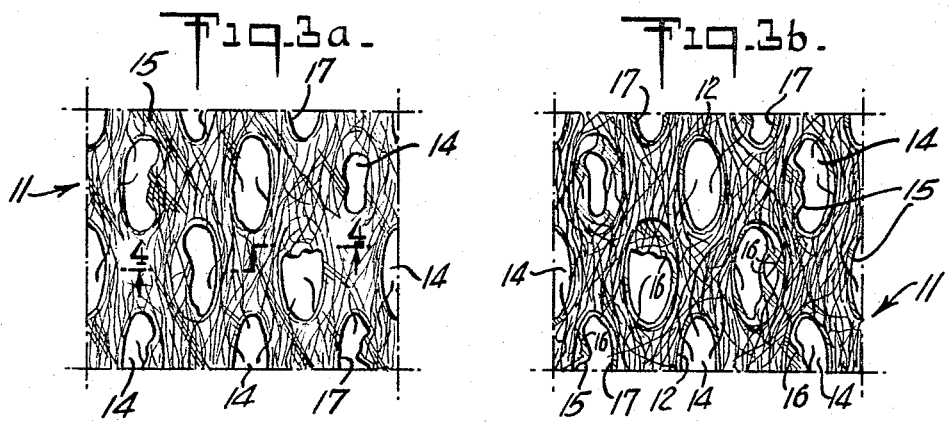
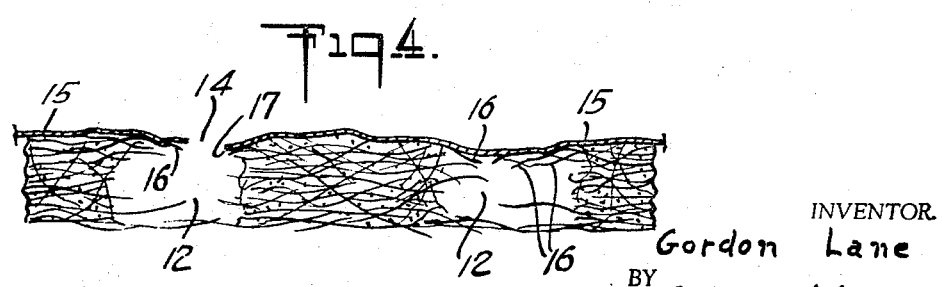
INVENTOR.
Gordon Lane
BY
Harold L. Warner
ATTORNEY

3,331,728
PERFORATE FILM-FIBER LAMINATE
Gordon Lane, Blakehurst, New South Wales, Australia, assignor to Johnson & Johnson, a corporation of New Jersey
Filed Feb. 17, 1964, Ser. No. 345,155
8 Claims. (Cl. 161—112)

The present invention relates to flexible fluid permeable film-fiber laminates and to the method of making the same. The perforate film-fiber laminates made by the process of the present invention, although not limited thereto, are useful in the preparation of dressings and the like where a relatively non-adherent dressing is desired.

It has been recognized that in the natural healing of animal wounds, the dressing serves primarily as a protection for the wound during the healing process. The problem with gauze and similar fibrous absorbent dressings is that during the healing process the eschar tends to form or grow around parts of the dressing, thus making it difficult to later remove the dressing without tearing the eschar or scab and thus delaying the healing. In order to overcome this, it has heretofore been proposed to use a smooth, thin, flexible, non-water soluble film in direct contact with the wound. The film, which may be made of any smooth flexible material, is perforated or cut to permit passage of fluids through the film to an absorbent backing. Dressings have been proposed wherein the flexible, non-water soluble, perforated film is bonded to or wrapped around an absorbent pad. Dressings of this type are described, for example, in the British patent to Gelinsky 439,085, specification acceptance dated Nov. 28, 1935, and the French patent to Weber 947,609, published July 7, 1949.

Although these film-faced dressings are a substantial improvement, insofar as preventing adherence of the dressing to the wound during the healing process, the size of the holes or perforations in the film must be quite small in order to prevent the eschar or dried body fluids from adhering to the absorbent material in the immediate vicinity of the perforations. Also, because of the relatively small size of the perforations, there is a substantial tendency for the perforations to become plugged or corked with dried body fluid, thus decreasing the effectiveness of the absorbent backing, this tendency being greater the smaller the perforations. This can be obviated to a substantial degree and the openings in the film made substantially larger if openings in the film coincide with openings in the portion of the fiber substrate immediate underlying such openings.

It is, accordingly, an object of the present invention to prepare laminates of thin flexible film to pervious substrates wherein the film is adhered to the underlying substrate and has openings therein immediately overlying openings in the substrate. It is a further object to prepare film-fiber web laminates that have openings passing therethrough wherein there are substantially no exposed fibers at the edge of the openings, the film forming material extending over any adjacent fibers in the immediate vicinity of the openings and tending to prevent any uncovered fibers from projecting through the openings in the film. It is a still further object of the present invention to provide a process for laminating thin films to pervious substrates while simultaneously perforating the film. A still further object is to provide pervious film-fiber laminates suitable for use as dressings and the like and for the preparation of dressings and the like wherein a perforate film side is adapted to be placed adjacent to the body and permit body fluids to pass therethrough to an absorbent backing, the perforate film side being relatively non-adherent to drying body fluids and healing tissue. Other objects and advantages of this invention will become apparent from the following description taken in connection with the accompanying drawings wherein are set forth by way of illustration and example certain embodiments of the invention.

It has been proposed to extrude extremely thin films of thermoplastic film forming materials, such as polyethylene and the like, directly onto a paper web while applying a vacuum to the under surface of the paper web to draw the extruded film into intimate contact with the upper surface of the paper while the film is still plastic and tacky to firmly anchor the film to the underlying paper. It has now been discovered that if a fiber substrate, including woven and non-woven fabrics, is used that contains definite pre-formed openings passing directly therethrough, such for example as illustrated in the non-woven fabrics described in U. S. Patent No. 3,081,515, a freshly extruded thermoplastic film, such for example as polyethylene, can be simultaneously perforated and adhered to the surface. This is done by drawing a sufficiently high vacuum on the surface opposite to that to which the film has been applied, sufficient to burst the film, while still highly plastic, in the areas immediately over the openings in the fiber substrate. By this process the film, while still in a plastic state, is drawn down into intimate contact with the very edge of the perforations and ruptured or burst in the areas immediately overlying the perforations. This results in a film-fiber laminate wherein not only is the film perforated immediately over the openings in the underlying fiber laminate, but in which the film also extends out slightly over the edge of the openings in the substrate covering fibers at the edge that would otherwise extend out unprotected beyond the edge of the film openings. Also film tends to overlie and shield fibers immediately adjacent the opening near the film coated surface, thus preventing the same from extending through the perforations so formed in the main body of film laminate. This results in a film-fiber laminate which is excellently suited for the preparation of dressings, sanitary napkins and the like, where it is desired to have a perforate relatively non-wound adhering film surface in contact with the patient or wearer backed by an absorbent fibrous material to which exudate can readily pass through the openings formed in the film surface while at the same time uncoated fibers are not present in the immediate area of such openings.

In practicing the present invention it is preferred to use extremely thin films, excellent results having been obtained, for example, with polyethylene films having a thickness of about ¼ to ½ thousandth of an inch. In the preferred practice the film-fiber laminates of the present invention are made in a continuous process with the film being laid onto the underlying perforate fiber web immediately as formed by a film extruder. Suction is applied to the underside of the web while the freshly extruded film is still in a highly tacky fluid state to secure intimate bonding between the film and the underlying fibrous web and at the same time rupture the film in the areas immediately overlying the openings in the fiber web. The film must be maintained in its semi-fluid and tacky state until after rupture of the film immediately over the openings in the underlying fiber web.

Referring to the drawings:

FIGURE 1 is a schematic view of apparatus showing the continuous lamination of freshly extruded thermoplastic film to a fiber web and the simultaneous perforation of the same in accordance with the present invention;

FIGURE 2 is a perspective view of a perforate film-fiber laminate made in accordance with the present invention;

FIGURE 3a is a top view of an enlarged fragment of the laminate shown in FIGURE 2;

FIGURE 3b is a bottom view of the fragment illustrated in FIGURE 3a, and

FIGURE 4 is an enlarged detail sectional view taken along line 4—4 of FIGURE 3a.

Referring to the drawings, a thin film 15 of polyethylene is extruded from extruder 10 directly onto a fibrous web 11 having openings 12 formed therein, the openings 12 being best illustrated in FIGURES 2 thru 4. Suction is applied to the underside of the web 11 while extruding the polyethylene film thereon and while the same is still soft and tacky by means of a suction box 13. The suction applied on the undersurface of the web 11 will depend on the thickness of the film and the plasticity of the film at the time. Sufficient suction must be applied, however, not only to draw the film 15 downwardly into intimate contact with the underlying web 11 but to also rupture the same in the areas of openings 13 to form openings 14 in the plastic film 15.

Where the thermoplastic film forming material being extruded onto the fibrous web is polyethylene the temperature of the polyethylene at the time of extrusion is in the range of about 580 to 700° F. After passing through a relatively short distance, generally not more than about 3–4 inches, this film while still hot and highly plastic is laid onto the underlying fiber web. The fiber web itself is at a substantially lower temperature. As cellulosic fibers have a tendency to tear when heated to temperatures as high as 300° F. for any extended time, care should be taken to keep the fiber web 11 substantially below this temperature. As there is some cooling of the film from the time that it leaves the nozzle of the extruder to the point where it overlies the fibrous substrate and is then subjected to the vacuum pull, the film generally at the time of deposit on the fiber substrate has a temperature of approximately in the order of about 500° to 650° F., this being approximately the temperature of the film at the time it is subjected to the vacuum used to draw it into intimate contact with the underlying fiber substrate and burst the film over the area of the openings passing through the fiber substrate. The extruded films themselves are quite thin, generally not exceeding about two-thousandths of an inch and in the preferred practice have a thickness of no more than about ¼ to ½ thousandth of an inch in thickness. The vacuum used to anchor and perforate the film is generally in the order of at least ½ atmosphere, i.e., a vacuum of about 14 inches of mercury. Substantially higher vacuums may be used and in some instances may be needed. The vacuum necessary to perforate as well as anchor depends in part on the thickness of the film and the size of the opening underlying the portion of the film to be burst. It is also dependent on the fluidity of the film at the time of bursting which, in turn, is dependent on the temperature of the film as well as the particular composition of the film-forming material. The vacuum, however, must be sufficiently high to not only anchor the film to the substrate but also to burst the film in the areas immediately over the openings which pass through the fiber substrate.

As the film is drawn down into the area of the openings 12 by the vacuum, the film contacts and adheres to the fibers 16 in the immediate area of the opening and tends to extend over the edge of the opening 12 as shown at 17. This is best illustrated in FIGURES 3 and 4.

Where the edge of the openings 12 through the fiber web 11 are not clear-cut but have fibers extending partially into the openings near the film covered surface, the film, as illustrated at 17, extends out over such fibers to form a protective film covering. Also where fibers extend across the opening and are adjacent the surface thereof, they are brought into intimate contact with the highly tacky freshly extruded film and have deposited thereon a protective film cover. The extended film edges 17 immediately surrounding the openings 12 and the film coatings covering fibers which cross the opening eliminates the tendency for uncovered fibers to protrude into the openings at the level of the film laminate.

By extruding the film, forming the film laminate 15, directly down onto the previous fibrous substrate and then simultaneously anchoring and perforating the same, as schematically illustrated in FIGURE 1, very thin laminates of film can be obtained without the problems usually associated with the handling of extremely thin films. Also, as the freshly extruded film is at a relatively high temperature when applied to the fiber web, it is relatively easy to keep the base fabric 11 at a temperature below which charring will occur. Accordingly, the preferred practice is to extrude the thermoplastic film directly onto the perforate fiber web. However, if desired, rather than extruding the film directly onto the perforate fiber base and anchoring and perforating the same while it is still in a pliable tacky state, the film may be formed separately and then deposited as a free film onto the underlying perforate fiber substrate. The film may then be heated separately, such for example as by infrared radiation applied to the same to a temperature such that it has a tendency to flow while the perforate fiber substrate is maintained below a temperature that would be detrimental to the same during the heating process. After the film was thus selectively heated to its flow temperature, a vacuum may then be applied to draw the heated film down into intimate contact with the underlying fiber substrate and burst the film in the areas immediately over the openings in the underlying perforate fiber base.

Where the fabric is to be used as a dressing, it is generally preferred that the film be quite thin, film thicknesses of less than 0.001 inch generally being preferred. There is no limit to film thinness except strength. Also the perforations in the film should be present in sufficient number to permit ready passage of excretions from the body surface covered into the aborbent backing. It is generally preferred that these perforations have an open area equivalent to a circle having a diameter of about 0.01 to 0.2 inch and be present in sufficient number and so dispersed to provide for each square inch of film surface an open area of at least 0.0075 square inch, the open area preferably being within the range of 0.1 to 0.4 square inch per square inch of film.

The perforate fiber base forming the fiber film laminate of the present invention is preferably formed of a non-woven fabric having openings or passages therethrough into which the plastic tacky film is drawn and over which the same is ruptured during the perforating and laminating of the film to the underlying fiber web. However, the process is not limited to the manufacture of perforate non-woven fiber base laminates but is also applicable to forming laminates of film and woven fabrics wherein the mesh of the woven fabric is an open mesh which provides the openings passing through the fabric into which the overlying film is drawn and ruptured when the differential pressure is applied across the film fabric composite.

Particular embodiments of the invention have been used to illustrate the same. The invention, however, is not limited to these specific embodiments. In view of the foregoing disclosure, variations or modifications thereof will be apparent and it is intended to include within the invention all such variations and modifications, except as do not come within the scope of the appended claims.

Having thus described my invention, I claim:

1. A perforate film-fiber laminate comprising a fiber web containing openings therein passing through said web with fibers of said web extending beyond the periphery of said openings, a thermoplastic film extending over at least one surface of said web and bonded to surface fibers of said web through intimate contact of said film and surface fibers while said film is in a heat softened state, said film having openings therein directly over the openings in said web the openings in said film being smaller than the immediately underlying openings in said web and of irregular shape and size the edges of the openings in said film extending over immediately underlying fibers of said web which extend beyond the periphery of said web openings.

2. A perforate fiber web of claim 1 wherein a substantial portion of fibers extending into the openings in said web adjacent the film coated surface thereof and beyond the edge of the immediately overlying openings in said film are coated with the material of said thermoplastic film.

3. A perforate film-fiber laminate of claim 1 in which said film has a thickness of not substantially greater than about one thousandth of an inch.

4. A perforate film-fiber laminate of claim 1 in which said fiber web is a non-woven fabric.

5. A perforate film-fiber laminate of claim 4 in which said fiber web is absorbent and said non-woven fabric is formed primarily of cellulosic fibers.

6. A perforate film-fiber laminate of claim 5 in which said film has a thickness of not substantially greater than about one thousandth of an inch.

7. A perforate film-fiber laminate of claim 6 in which said film is a polyethylene film.

8. A perforate film-fiber laminate of claim 1 in which said film is polyethylene.

References Cited
UNITED STATES PATENTS

| | | | |
|---|---|---|---|
| 3,068,547 | 12/1962 | L'Hommedieu | 161—112 |
| 3,077,882 | 2/1963 | Trewella | 128—156 |

EARL M. BERGERT, *Primary Examiner.*

D. J. DRUMMOND, *Assistant Examiner.*